United States Patent [19]

Baird

[11] Patent Number: 5,022,788

[45] Date of Patent: Jun. 11, 1991

[54] SUBDUCTIVE WASTE DISPOSAL METHOD

[76] Inventor: James R. Baird, 1401 Rose Ann Drive, Nanaimo, British Columbia, Canada, V9T 4L3

[21] Appl. No.: 449,750

[22] Filed: Dec. 13, 1989

[51] Int. Cl.[5] .......... G21F 9/34; B09B 1/00

[52] U.S. Cl. .......... 405/128; 405/136

[58] Field of Search .......... 405/128, 129, 136

[56] References Cited

U.S. PATENT DOCUMENTS

| | | | |
|---|---|---|---|
| 4,178,109 | 12/1979 | Krutenat | 405/128 |
| 4,428,700 | 1/1984 | Lennemann | 405/128 |
| 4,464,081 | 8/1984 | Hillier et al. | 405/128 |
| 4,586,849 | 5/1986 | Hastings | 405/128 |
| 4,784,802 | 11/1988 | Mallory et al. | 405/128 X |
| 4,844,840 | 7/1989 | Feizollahi | 405/128 X |

FOREIGN PATENT DOCUMENTS

| | | | |
|---|---|---|---|
| 2742340 | 3/1979 | Fed. Rep. of Germany | 405/128 |
| 0023872 | 2/1977 | Japan | 405/128 |
| 547 | of 1856 | United Kingdom | 405/136 |

*Primary Examiner*—Randolph A. Reese
*Assistant Examiner*—John A. Ricci
*Attorney, Agent, or Firm*—John Russell Uren

[57] ABSTRACT

A method for the disposal of nuclear and toxic waste materials comprising the placing of waste materials into waste repositories radiating from an access tunnel constructed into a subtending tectonic plate adjacent or as near as possible a subduction zone. The waste materials descend within the tectonic plate into the mantle of the earth.

13 Claims, 5 Drawing Sheets

FIG. I

SUBDUCTIVE WASTE DISPOSAL METHOD

BACKGROUND OF THE INVENTION

1. Field of the Invention

This invention relates to the disposal of waste materials and, more particularly, to the permanent disposal of nuclear and toxic materials by depositing such materials in a subtending tectonic plate adjacent or as near as possible to a subduction zone.

2. Description of the Prior Art

The disposal of radioactive wastes from nuclear reactors and other atomic energy activities and of toxic byproducts caused by manufacturing and medical and biologic activities is an area of widespread concern. The long half-life of radioactive waste products and chemical compounds in which radioactivity is found presents a formidable obstacle to storage which will be inherently safe over the years. This is more clearly understood when it is realized that roughly 2.23 cubic meters of solid radioactive nuclear waste are produced annually by a conventional 1000 MW reactor. It is estimated that in the United States, the quantity of high-level radioactive waste generated by reactors to the present time would cover a football field to a height of three feet. Highly toxic Plutonium 239, which is included with this waste, has a half-life of approximately 25,000 years. Ten half-lives are required to reduce this radioactivity by a factor of one-thousand (1,000) which is generally considered to be the required safety level for exposure in the atmosphere. Thus, Plutonium 239 wastes should be isolated for a period of at least 250,000 years. Such toxic material must therefore be disposed in a location where it is impossible for the waste to find its way back into the environment for at least 250,000 years and, preferably, much longer. In respect of chemical wastes such as PCB's, however, they may retain their toxicity indefinitely and, therefore, it is desirable to ensure they remain undisturbed until their eventual destruction.

Presently, nuclear wastes are initially removed from a reactor and are placed in large vats of water while a cooling process takes place. Thereafter, they must be stored. Various techniques of storage have been considered including geologic repositioning within the continental crust and the implantation of solidified high-level waste or spent nuclear fuel into stable clay type sediments in low circulation regions in the mid-ocean. In addition, the construction of boreholes having the capability to store such wastes in the tectonic plate adjacent a subduction zone is described in U.S. Pat. No. 5,4,178,109 to Krutenat.

Such techniques, however, suffer inherent disadvantages. Nuclear wastes disposed of in a geologic repository on the continental crust have the potential to be tampered with by individuals or countries. Such wastes may accidentally be unearthed in the future by various actions and thereby become exposed to the environment. Wastes in a geologic repository also have the potential for intermingling with and contaminating the water cycle. Earthquake activity is also a problem in that it may fracture the geologic repository and release waste back into the environment. Volcanic activity, an act of war or sabotage, or impact by a celestial body could produce the same result.

A lack of international consensus or agreement is a major obstacle to the implantation of high-level radioactive waste containers in clay type sediments in the low circulation regions of the mid-ocean. Waste implanted in ocean sediments would also be subjected to natural upheavals and to mechanical perturbation once they eventually migrated to a subduction zone, as all seabeds are so predestined, as a portion of the sediment would be scraped off along the abutting continental edge. Wastes could then migrate back to the biosphere because of this abrasive action. Even if the sediment and embedded waste were subducted, the waste could return to the environment because of andesitic volcanism adjacent the subduction zone. This is so because it is believed that at a depth of near one hundred (100) kilometers within the earths crust, heat and pressure cause water to be driven from the crystalline structure of the subducted sediments. The heat generated by this phase change combined with the temperature of the rock at that depth causes some of the sediment and overlaying rock to melt and to rise to the surface as volcanoes. Waste melted along with the sediment could thereby return to the biosphere dissolved in the molten rock creating an undesirable environmental condition.

In the aforementioned U.S. Pat. No. 4,178,109, there is proposed a technique of disposing of wastes in boreholes at the edge of a subduction zone. While this is an improvement in the location of waste repositories, many problems remain inherent in this solution. Boring a single hole into the seabed from a platform on the surface of the ocean is a difficult and painstaking undertaking and hundreds of such boreholes would be required to accommodate world backlogs of high-level nuclear wastes because of the inherent size limitation caused by drilling. After construction of the borehole in the seabed, it would be difficult to relocate the hole and to deposit the waste into the hole. Such depositing would, apparently, require manipulation of the waste by apparatus located on the sea floor to fill the hole. This could not only be hazardous but an accident while filling the hole could scatter radioactive debris over the seabed. The waste, probably, would also inherently be required to be unshielded when deposited, again because of the diameter of the borehole which would prohibit protective sheathing from being inserted with the waste.

Likewise, the problem of scouring mechanical action as the subtending oceanic crust scraped against the non-descending crust would create problems since waste implanted in boreholes in the oceanic crust any distance from the originating ridge would likely be necessarily implanted in the sedimentary layer. This sedimentary layer is, on average, three (3) to four (4) kilometers thick at the subduction zone.

In respect of toxic wastes such as chemical, medical and biological wastes, typical previous disposal techniques include incineration and burial or dumping of such wastes in the sea. These are also disadvantageous.

Incineration of toxic wastes requires the process to be conducted within exacting tolerances. Otherwise, the potential for generating other poisons, which may be even more hazardous than those originally intended for disposal, exists. Even when carried out under ideal conditions, incineration is inherently atmospheric polluting.

Burying toxic wastes and low-level radioactive wastes has also proven disadvantageous. There have been instances where buried wastes have percolated through the overburden meant to isolate it, thereby contaminating the overlaying property such as the Love Canal, in upstate New York, U.S.A. Buried wastes have frequently been inundated by or have themselves seeped into subterranean aquifers thereby fouling the fresh water supply.

Medical and other wastes thought to have been eliminated when dumped at sea frequently have washed ashore and have received widespread publicity in doing so.

The earth's crust is formed of large solid tectonic plates. These large tectonic plates are formed at ocean ridges and slowly migrate until they reach "subduction" zones at which location they re-enter the earth at an average rate of six (6) cm per year.

An objective of the present invention is to place waste material in repositories radiating outwardly from an access tunnel bored into the basaltic layer of the oceanic crust beneath sediments overlaying the basaltic layer at or as near as possible the edge of a subduction zone. The access tunnel would originate from land on the nondescending side of a subduction zone, from the surface of the subducting plate itself, from a man-made or naturally formed island situated over a tectonic plate that is moving towards a subduction zone or from a caisson situated over the subtending tectonic plate. Each repository filled with waste would be sealed from the access and, accordingly, the biosphere, by a plug. The crustal downwards movement of the tectonic plate would carry the waste into the interior of the earth. Many millions of years would be required for the waste to circulate through the earth's mantle before it could reemerge in a diluted, chemically and physically altered form at an oceanic ridge.

There are several areas located throughout the world that are favorable locales for the tunnel and repository process described herein. In Canada, the Brooks Peninsula on Vancouver Island in the Province of British Columbia, Canada and the Scott Islands north of Vancouver Island are located on the non-descendlng, North American Plate side of the Cascadia subduction zone. They are located near enough to the subducting Explorer Plate to make accessing the subducting plate by a tunnel with an origin on the North American side of the subduction zone possible. The subduction zone is also shallow enough, in the range of 1 mile, opposite these sites to permit successful tunneling beneath the Pacific Ocean.

In the United States, Cape Mendecino north of San Francisco in the State of California is similarly situated but located a greater distance from the subducting zone. A tunnel from Cape Mendecino into the subducting Gorda Plate would likely be of similar dimensions to the one recently completed in Japan to link the islands of Honshu and Hokkaido and to the tunnel between France and Great Britain presently under construction. Accordingly, the feasibility of constructing such a tunnel has been demonstrated.

In New Zealand, the subduction of the Pacific Plate beneath the Indo-Australian Plate takes place partially on the North Island. To implement the process according to the invention in New Zealand, a tunnel would only have to be pushed far enough into the Pacific side of the North Island that waste deposited in repositories radiating from it would not be encountered accidentally by mineral or petroleum prospectors in the future.

The Hawaiian and Mariana Islands are situated above tectonic plates moving towards subduction zones. Tunnels from these or similar islands could access repositories in an oceanic plate which would be subducted at some predictable time in the future.

It may also be feasible to construct a man-made island as near as possible to the subduction zone so that repositories could be accessed via a tunnel, originating on the island, constructed into the subducting plate. Such an island, for example, has been constructed in the Beaufort Sea and used as a base for drilling exploratory oil and gas wells.

A caisson could also be used to access a shallow tectonic plate near a subduction zone so that repositories could be radiated from an accessing tunnel constructed from the caisson which would act similar to a man-made island.

Once accessed, the subducting plate could yield as many waste repositories as necessary to eliminate current waste backlogs as well as future requirements. Each repository, once filled, would be sealed from the tunnel access and, accordingly, the biosphere by a plug.

SUMMARY OF THE INVENTION

Briefly, the present invention comprise's a method for the disposal of waste material. The waste material is placed into repositories radiating from an accessing tunnel tunnelled into the tectonic plate adjacent or as near as possible to a subduction zone. The descending tectonic plate carries the waste material into the earth's mantle.

Another object of the present invention is to provide a method for disposing nuclear and toxic waste by placing the waste in a repository deep enough in the tectonic plate so that it will not return to the environment as a consequence of the mechanical action as the descending plate scrapes against the non-descending plate or volcanism as a result of a phase change and melting of the sediment taking place at depth.

Still another object of the present invention is to provide a method for disposing nuclear waste in a repository in the tectonic plate which is sufficiently large so that nuclear waste can be transported to and placed in the repository in shielded containers.

Still another object of the present invention is to provide a method for disposing stockpiled toxic wastes in a repository in the tectonic plate which repository is sufficiently large such that toxic wastes could be transported to and placed in the repository in the containers in which they are stockpiled.

Other objects, advantages and novel features of the invention will become apparent from the following detailed description of the invention when considered in conjunction with the accompanying drawings wherein:

BRIEF DESCRIPTION OF THE SEVERAL VIEWS OF THE DRAWINGS

An embodiment of the invention will now be described, by way of example only, with the use of drawings in which.

DESCRIPTION OF THE PREFERRED EMBODIMENT

In respect of the following and previously set out description and explanation, it should be understood that while the information given is considered to be correct, such explanations are necessarily somewhat speculative since the amount of factual information relating to the earth's crust and deep mantle is limited. Applicant would not want to be bound, therefore, by the following explanations if, subsequently, new and better information becomes available. The explanations hereinafter given are made for the purpose of full and complete disclosure of the invention but the qualification given above should be borne in mind.

Figure 1:
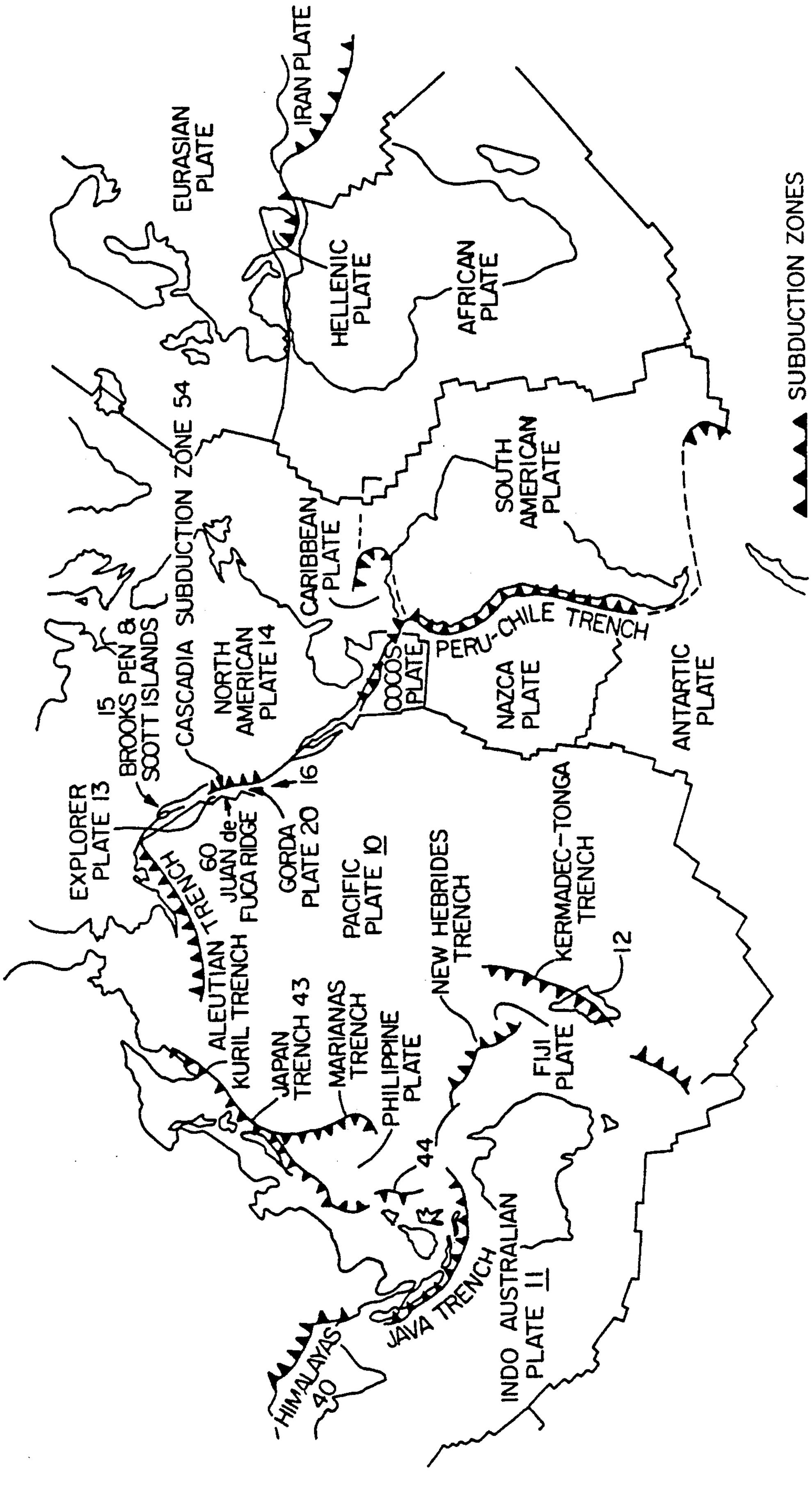
FIG. 1 is a world map illustrating subduction zone and plate locations.

With reference now to the drawings, FIG. 1 illustrates the locations of subduction zones and plates throughout the world. The Pacific Plate 10 subducts the Indo-Australian Plate 11 on the North Island of New Zealand 12. The Explorer Plate 13 subtends the North American Plate 14 opposite the Canadian located Brooks Peninsula and Scott Islands generally illustrated at 15. The Gorda Plate 20 subtends the North American Plate 14 opposite the United States site of Cape Mendecino generally shown at 16.

The four locations set out above are the only naturally occurring sites where the topography would allow a viable tunnelled access using current technology to the subduction zone where the tectonic plate descends adjacent the non-descending earth's crust. All other subduction zones are associated with deep ocean trenches and/or are situated far enough from land, that accessing them by a tunnel would be impractical. One exception is the Himalayas Subduction Zone. The truncated nature of the Himalayas Subduction Zone 40, however, where the continental crust subtends another continental crust makes India a less desirable location to dispose of high-level radioactive waste than the four locations set forth above.

Figure 2:
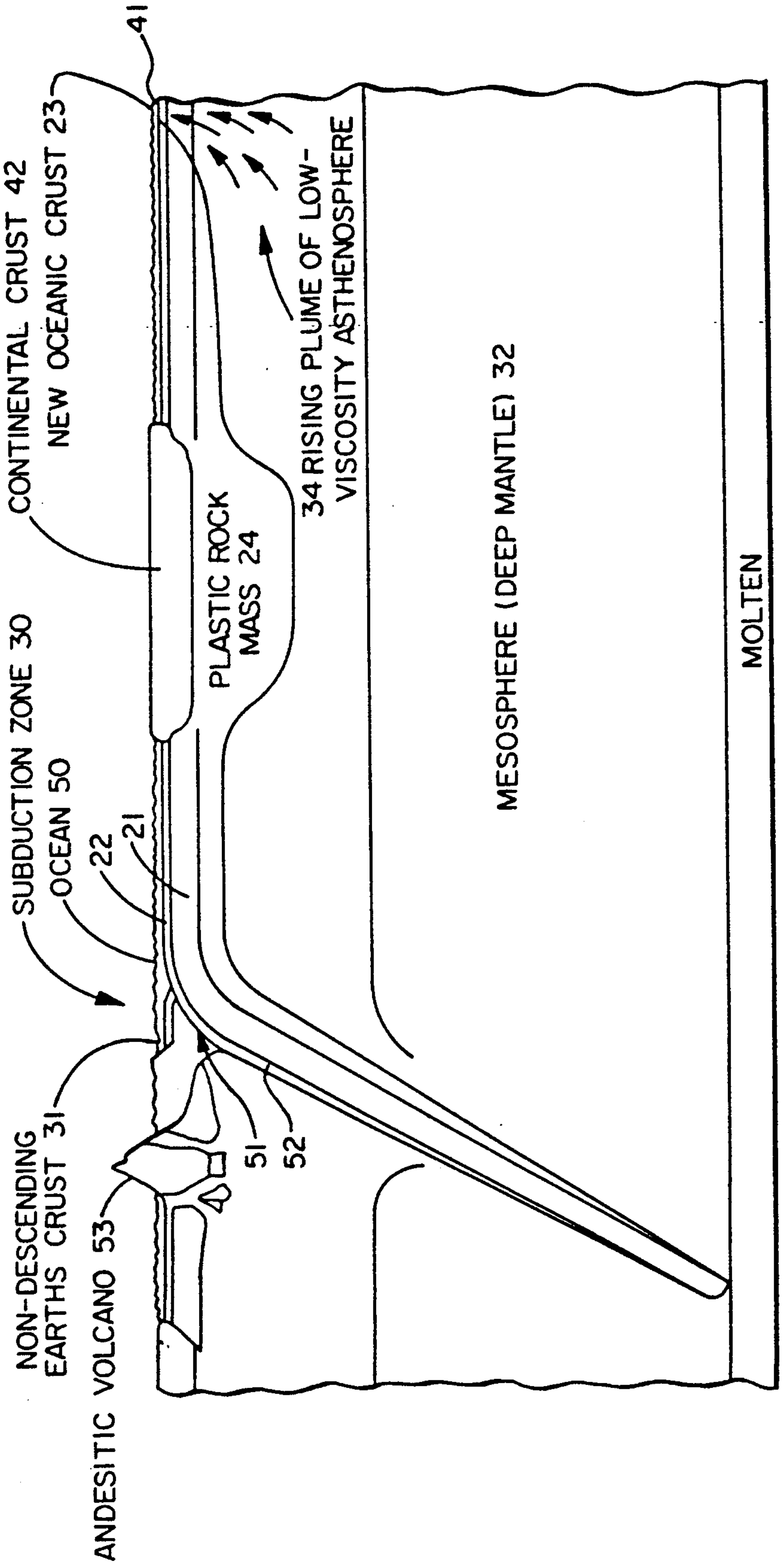
FIG. 2 is a diagrammatic sectional view illustrating areas of the earth's crustal formation where typical subduction occurs.

A typical subduction zone generally illustrated at 30 is shown in FIG. 2. The descending tectonic plate generally illustrated at 21 includes the sedimentary layer 22, the oceanic crust 23, the continental crust 42 and some semi-plastic rock mass 24. The subduction zone 30 denotes the boundary between the tectonic plate 21 and the non-descending plate 31. The tectonic plate 21 descends at a rate of about 6 cm per year into the earth's mantle 32. This phenomena is a result of the generation of the oceanic crust 23 by the rising plume of low-viscosity asthenosphere 34 at an oceanic ridge 41. The oceanic crust 23 which forms into a portion of the tectonic plate 21 moves to the left as indicated by the arrows in FIG. 2. The continental crust 42 of the tectonic plate 21 does not exist off the North American coast but could represent, for example, the Hawaiian Islands as they move towards subduction at the Japan Trench 43 (FIG. 1), or the Mariana Islands as they move towards subduction at the Phillipine Trench (not shown).

The tectonic plate 21 is covered with ocean water 50 and comprises the sedimentary layer 22, the oceanic crust 23 and the continental crust 42. It descends back into the center of the earth at the subduction zone 30. It is contemplated that tens of millions of years would pass for the material in the tectonic plate 21 at the subduction zone 30 to descend downwardly as a solid, melt at a depth of approximately 700 kilometers, mix and become part of the liquid rock currents in the mantle 32 and, thereafter, migrate and return to the surface of the earth at the oceanic ridge 41. This time, of course, is far in excess of the time required for nuclear or other toxic waste materials to become harmless. It is calculated, for example, that Plutonium 239 placed in repositories in the tectonic plate 21 at the subduction zone 30 will reach a depth 51 of about fifteen (15) kilometers when it becomes radioactively harmless at an estimated subduction rate of about 6 cm per year and the approximately 250,000 years needed for Plutonium 239 to become radioactively harmless. The heat and pressure within the earth are also effective in reducing the toxicity of non-nuclear waste.

At the subduction zone 30, the abrasion of the tectonic plate 21 against the non-descending plate 31 will cause portions of the sedimentary layer 22 to be scraped off the tectonic plate 21 which sediment is added to the non-descending plate 31 although some sediment may later be dragged into the mantle 32 by the tectonic pate 21 by the same abrasive action. At a depth of 100 kilometers illustrated at 52, the subducted sediment undergoes a phase change as heat and pressure drive water from the crystal structure. Some of the sediment will malt and rise to the surface as andesitic volcanoes 53. As the tectonic plate 21 descends further into the earth, it thins due to partial plasticizing and an increase in the rate of descent due to the current flow within the mantle 32.

Figure 3:
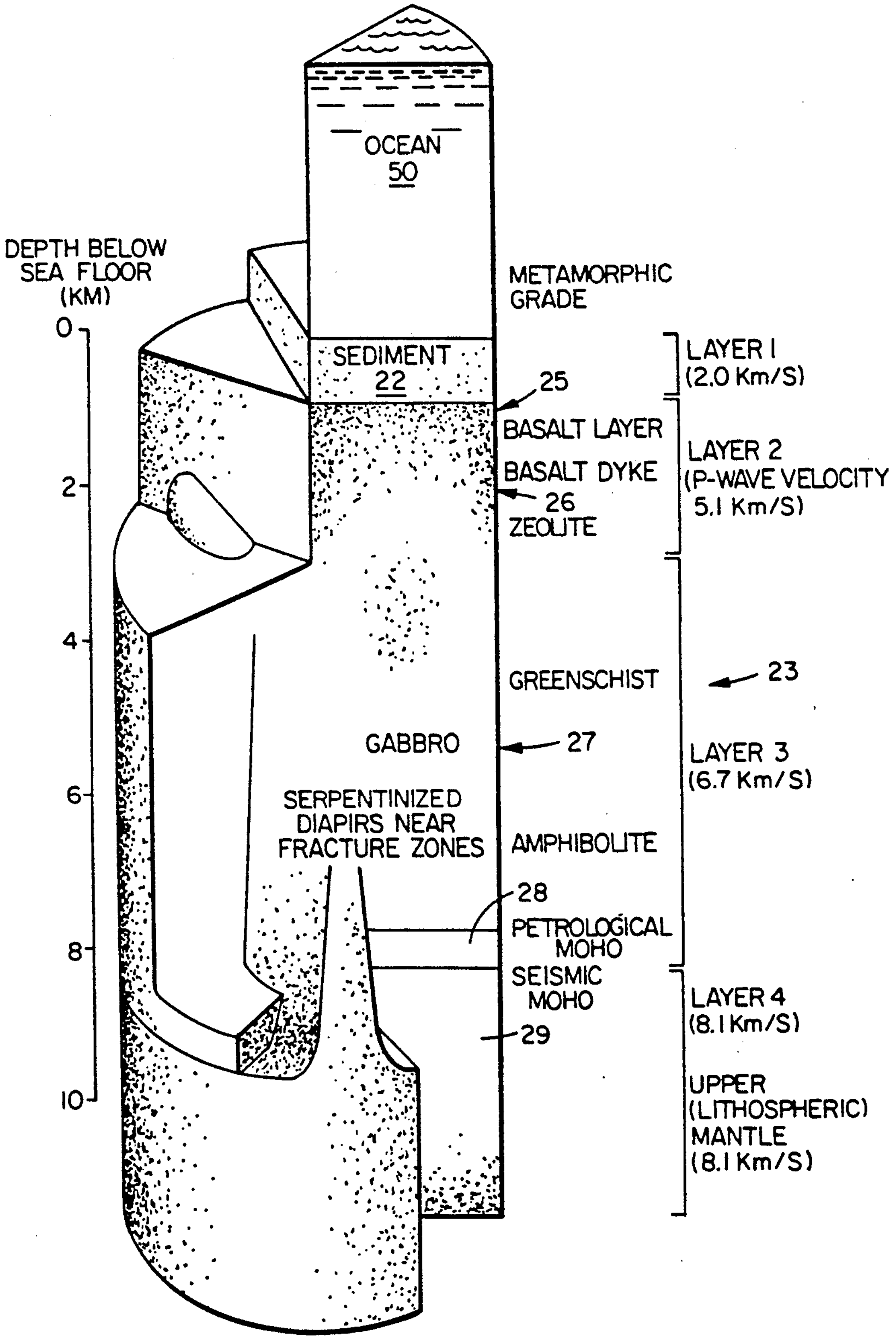
FIG. 3 is a diagrammatic sectional view taken of a portion of the ocean crust.

A section illustrating the ocean 50, sediment 22 and oceanic crust 23 is shown in FIG. 3. The oceanic crust. 23 comprises the basalt lava 25, the basalt dykes 26, the gabbro 27, the layered peridotite 28 and the peridotite 29. The combination of the sedimentary layer 22 and the oceanic crust 23 comprises the tectonic plate 21. The illustration is based on seismic velocity interpretations, evidence from dredged samples and comparisons with outcrops of rocks thought to have once been parts of ocean floors. At most subductior zones, the ocean 50 is deep as subduction zones are typically associated with trenches which reach depths as great as seven (7) miles. The Cascadia Subduction Zone 54 (FIG. 1), however, lays typically beneath only one (1) mile of water and thus the subducting tectonic plate 21 could be accessed by a tunnel from the non-descending plate 31 which, in this event, for example, would be the Brooks Peninsula, the Scott Island or Cape Mendicino. The thickness of sedimentary layer 22 over the oceanic crust 23 ranges from zero at the oceanic ridge 41 where the oceanic crust 23 is formed from the rising plume of the mantle 32 to an average of 3 to 4 kilometers near continental edges where the oceanic crust 23 is typically subducted. The further a plate has spread from its originating oceanic ridge 41, the older it is assumed to be and thus the thicker is the sediment 22 overlaying it having regards to the fact that the sedimentary layer 22 is built up over millions of years by debris raining onto the ocean floor.

The Cascadia Subduction Zone 54 (FIG. 1) is only 550 kilometers from the Juan de Fuca Ridge 60 at its widest point. It is assumed, therefore, that the sedimentary layer over the Explorer Plate 13, the Juan de Fuca Plate (not shown) and the Gorda Plate 20 which are all subducted at the Cascadia Subduction Zone 54 would be considerably thinner than three (3) kilometers in depth. Accordingly, the sedimentary layer 22 could be tunnelled through using a method similar to conventional mining techniques such as those which have operated in South Africa to a depth of 9300 feet. If the sedimentary layer 22 proves to be three (3) to four (4) kilometers thick at the Cascadia Subduction Zone 54, however, it is: contemplated that tunneling to the bottom of the sedimentary layer 22 and radiating repositories at that depth as set forth in more detail hereafter should allow a sufficient overlaying buffer from the effects of abrasion and volcanism suffered by the sediments in the upper regions of the sedimentary layer 22 during subduction. Preferably, however, a tunnel would be driven into the oceanic crust 23 beneath the sedimentary layer 22 before waste repositories are radiated from the tunnel access.

Figure 4:
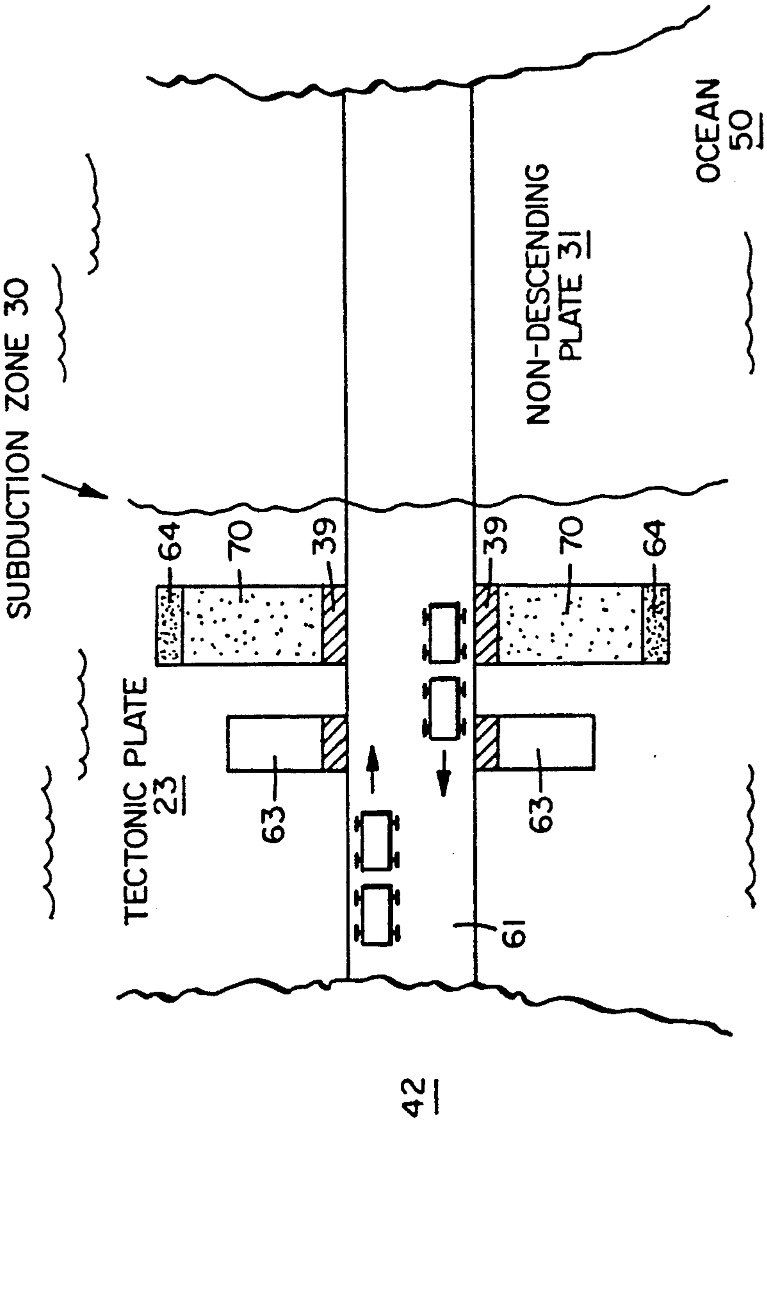
FIG. 4 is a plan view of two possible accessing tunnels and their associated repositories according to the invention, the first tunnel traversing the subduction zone from the non-descending plate and the second tunnel being constructed into the subtending tectonic plate to a position as near as possible to the subduction zone.

The accessing tunnel 61 envisioned according to the invention in a first embodiment traverses the subduction zone 30 (FIG. 5) from the non-descending plate 31 and bores into the descending tectonic plate 21. Alternatively, and in a second embodiment, the tunnel 61 could originate from the continental crust 42, including a natural or man-made island, on the descending side of the subduction zone 30. In either case, repositories 63 radiate outwardly from the tunnel 61 as shown more clearly in FIG. 4. The repositories 63 would be filled with the most hazardous wastes 64 in the distal reaches of the respective repository and the least hazardous wastes 70 such as low-level radioactive waste could act as a buffer between the high level radiation and thermal heat of the high-level radioactive wastes 64 and the plug 39, thereby better isolating both types of waste from the biosphere.

Figure 5:
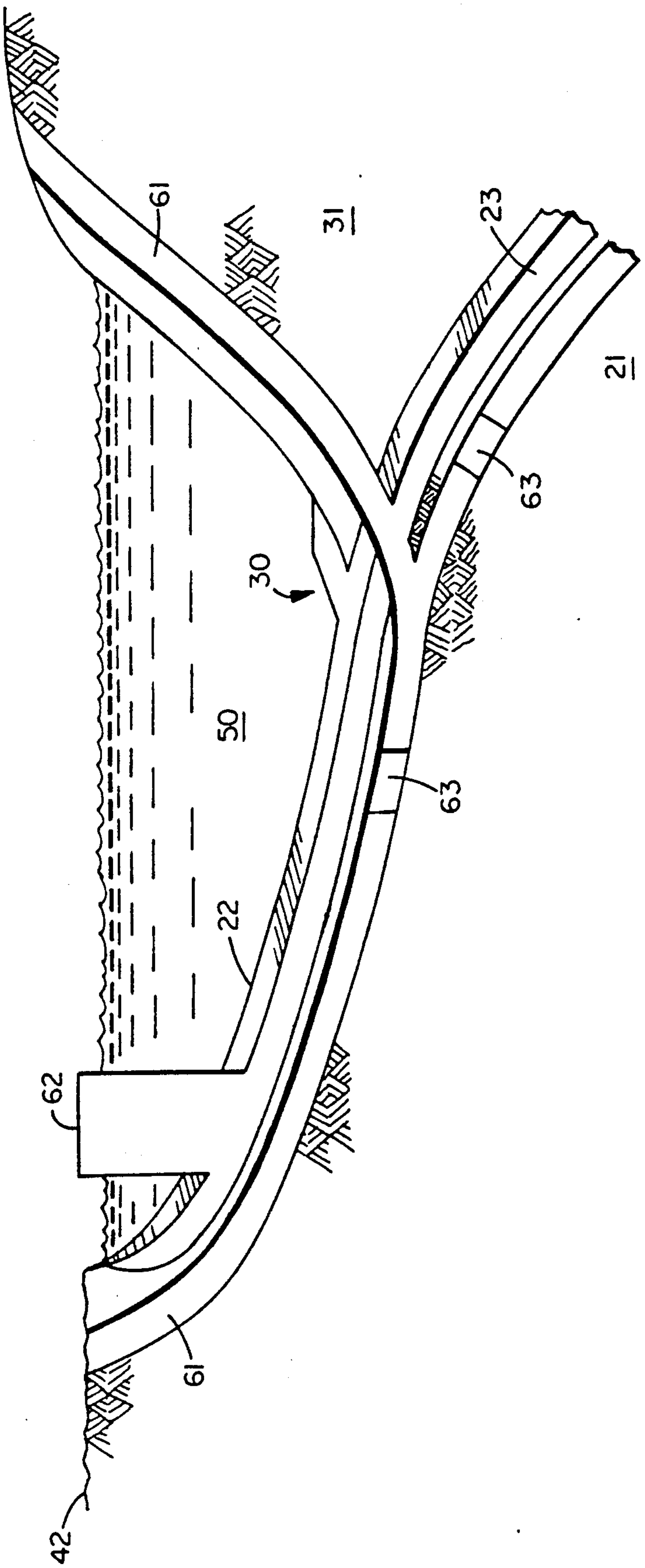
FIG. 5 is a side view of the accessing tunnels of FIG. 4 and their associated repositories.

As viewed in FIG. 5 a caisson 62 could also be used to access the tectonic plate 21 via the access tunnel 61. It can also be seen in FIG. 5 that in a preferred embodiment of this invention, the access tunnel 61 would have a sufficiently large cross section to permit the simultaneous removal of tailings from repositories 63 undergoing excavation as well as importation of wastes into the repositories 63.

The following describes the approximate volume of high level radioactive waste to be disposed of having in mind current waste stockpiles.

If the amount of radioactive waste stockpiled at present is assumed to be approximately 135,000 feet, it is calculated that the repositories required would have a width and height of approximately 15 ft×15 ft, the repositories having a lineal distance of about 600 feet being required to dispose of the current U.S. stockpile. If the waste is shielded before being brought to the disposal site, and assuming this adds five (5) times the volume to the waste, approximately 3000 lineal feet of repository would be required which is well within current technological abilities.

Besides the use of an access tunnel to allow the deposit of wastes in a subtending tectonic plate, it is also contemplated that the use of an access tunnel or borehole across the subduction zone could be utilized for installing and monitoring instrumentation which could be used to determine the movement of the subtending tectonic plate relative to the non-descending plate in the subduction zone. This possibly, could be useful for more accurately determining the onset of earthquakes at various locations on the earth's surface which could bear some relationship to the movement of the plates at the subduction zone.

While a specific embodiment of the invention has been described, many modifications will readily occur to those skilled in the art to which the invention relates. Accordingly, such description should be taken as illustrative of the invention only and not as limiting its scope as defined in accordance with the accompanying claims.

What is claimed is:

1. A method for disposing waste material comprising the steps of:

a. constructing an access tunnel into a subtending tectonic plate moving towards a subduction zone, the tunnel having a sidewall and a floor for the movement of material transporting vehicles thereon;

b. forming at least one separate waste repository in the sidewall of the tunnel and emanating from said access tunnel; and c. depositing said waste material from inside the tunnel into said waste repository.

2. A method as in claim 1 wherein said tectonic plate comprises a sedimentary layer and an oceanic crust, said waste repositories being formed in the lower portion of said sedimentary layer.

3. A method as in claim 2 and further comprising forming waste repositories in said oceanic crust.

4. A method as in claim 1 wherein said access tunnel extends from an island to said tectonic plate.

5. A method as in claim 4 wherein said island is man-made.

6. A method as in claim 1 wherein said access tunnel extends from a non-descending plate to said tectonic plate.

7. A method as in claim 1 wherein said repositories extend substantially normal to said access tunnel.

8. A method as in claim 1 wherein said access tunnel extends from a caisson to said tectonic plate.

9. A method as in claim 1 wherein said repositories are of a volume to hold shielded waste material.

10. A method as in claim 9 wherein said waste material is radioactive material.

11. A method as in claim 10 wherein said waste material is divided into waste material having high radioactivity and waste material having lower radioactivity, said high radioactivity material being located further from said access tunnel within said repositories than said waste material having lower radioactivity.

12. A method as in claim 10 wherein said waste material is divided into waste material having high radioactivity and toxic waste, said toxic waste being located between said high radio activity, waste material and said access tunnel.

13. A method as in claim 1 and further comprising constructing said access tunnel to a size sufficient to allow simultaneous removal of the tailings obtained from forming said access tunnel and said waste repositories and to allow importation of wastes into said waste repositories.

* * * * *